United States Patent [19]

Fiorina et al.

[11] Patent Number: 5,272,387
[45] Date of Patent: Dec. 21, 1993

[54] CONNECTING DEVICE OF AN EXTERNAL ELECTRICAL POWER SUPPLY SOURCE TO AN AIRCRAFT ON THE GROUND

[75] Inventors: Jean-Noël Fiorina, Seyssinet-Pariset; Jean-Jacques Pillet, St. Egreve, both of France

[73] Assignee: Merlin Gerin, France

[21] Appl. No.: 789,085

[22] Filed: Nov. 7, 1991

[30] Foreign Application Priority Data

Oct. 14, 1991 [FR] France .................. 91 12727

[51] Int. Cl.$^5$ .......................................... H02J 9/00
[52] U.S. Cl. .......................... 307/130; 307/113; 307/125; 307/131
[58] Field of Search .................. 361/85, 86, 87; 307/113, 114, 116, 125, 126, 127, 130, 131, 139, 140, 141, 141.4, 148

[56] References Cited

U.S. PATENT DOCUMENTS 3,390,275  6/1968  Baker ........................... 307/64
3,601,659  8/1971  Tanaka ......................... 307/85
3,761,733  9/1973  Wolpert ........................ 307/86
4,937,462  6/1990  Recker et al. ................. 307/19

FOREIGN PATENT DOCUMENTS 1108963  4/1968  United Kingdom .
1108964  4/1968  United Kingdom .

Primary Examiner—Jeffrey A. Gaffin
Attorney, Agent, or Firm—Parkhurst, Wendel & Rossi

[57] ABSTRACT

A device connects an external electrical power supply source to an aircraft on the ground to temporarily replace its auxiliary power units. During the overlap period of the two switches used in the aircraft to achieve this transfer, an impedance, preferably a resistance much greater than the internal impedance of the external source is connected in series on the external line. As soon as switching to the external source has been completed, measurement of a sudden drop in the external voltage brings about closing of a static switch which short-circuits the resistance.

11 Claims, 3 Drawing Sheets

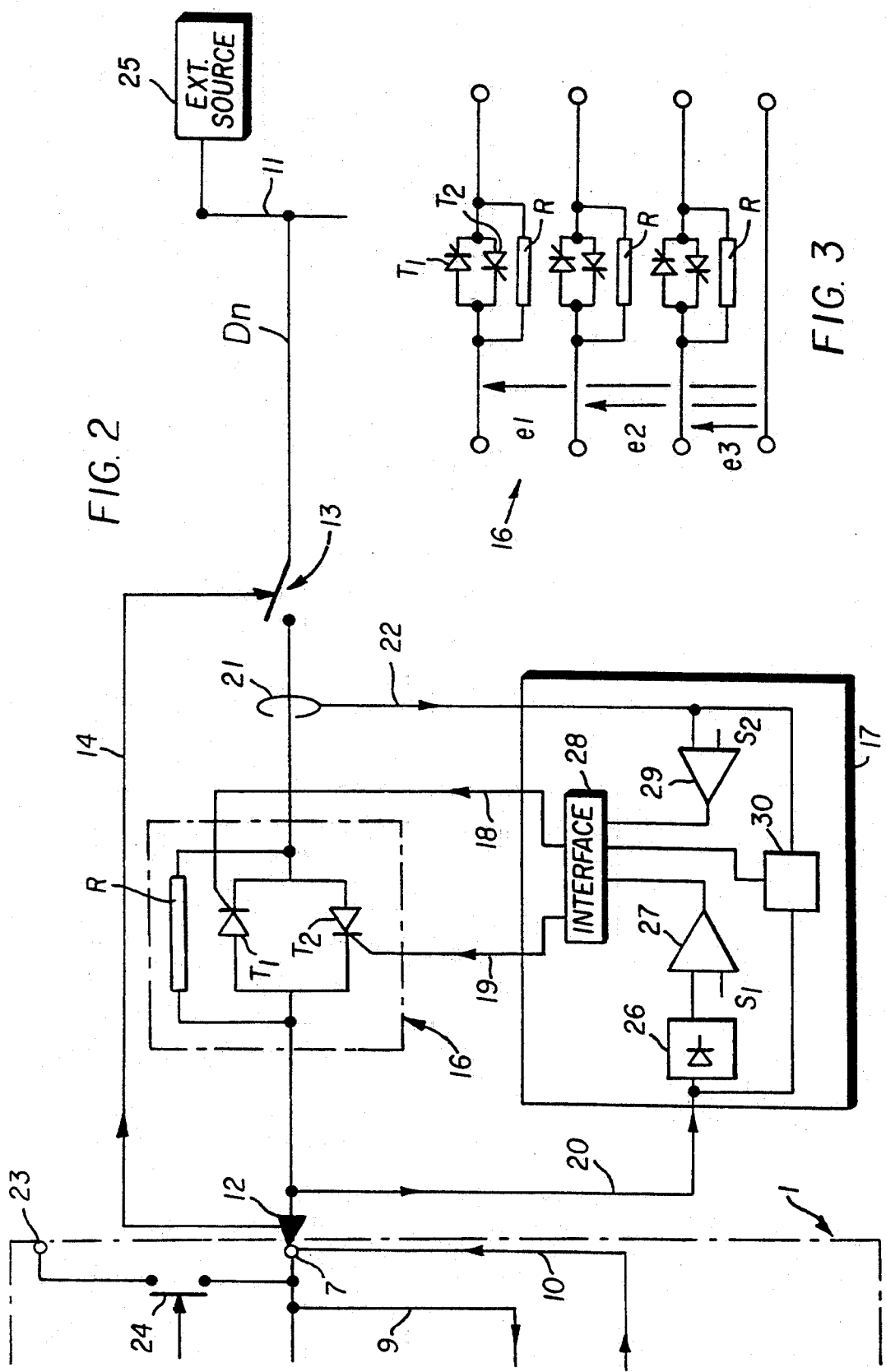

CONNECTING DEVICE OF AN EXTERNAL ELECTRICAL POWER SUPPLY SOURCE TO AN AIRCRAFT ON THE GROUND

BACKGROUND OF THE INVENTION

The present invention relates to a device for connecting an external electrical power supply source to an aircraft on the ground.

It is standard practice, in particular to avoid an excessive noise level in airports, to replace the internal electrical power supply system of an aircraft on the ground by an external source, such as a static power supply or a power supply using one or more electrical generating sets. It can indeed be understood that, if the aircraft auxiliary power units (or APU) have to be shut down on the ground, it is necessary to continue providing an electrical power supply without discontinuity to some of the aircraft equipment, including the lighting and heating systems, and especially the in-board computers which must not suffer any electrical power supply interruption, even a brief one.

In the past, aircraft were equipped with battery banks whose purpose was to continue supplying at least the in-board computers during the time interval elapsing between the two successive operations which were then performed consisting first in disconnecting the in-board 400 Hertz auxiliary power units, and then in connecting the external source to the electrical installations of the aircraft, this connection being in fact achieved by connecting the external source to a connecting socket provided for this purpose underneath the aircraft.

In order to save weight and volume, these back-up batteries have been eliminated on aircraft of recent model and replaced by an electronic measuring, computing and control device whose purpose is to perform connection of the external source and correlative disconnection of the in-board generators with a very small overlap time under phase agreement conditions which should, in principle, enable any break in the power supply to the in-board computers to be avoided, whilst not giving rise to any damaging phenomena.

FIG. 1 is a schematic block diagram of an installation of this type, such as is fitted at present to a certain number of aircraft of recent model.

The part which is comprised inside the aircraft and which is surrounded by a dashed outline is designated in this figure by the reference 1.

The aircraft conventionally includes at least one in-board auxiliary power unit 2 which delivers a 400 Hertz alternating current on a three-phase electrical power supply line 3 supplying the in-board equipment.

Supply of the line 3 is achieved via a three-phase switch X2, whose opening and closing are controlled by a measuring, computing and control unit 4. This unit 4 is connected by a control input 5 to the aircraft cockpit. Control of the switch X2 is achieved via a connecting line 6.

The central power supply line 3 is also connected, via another three-phase switch X1 similar to the switch X2, to an external multipin socket 7, generally located underneath the aircraft, which is designed for connection to an external source. The switch X1 is controlled by the unit 4 via a connecting line 8.

Inside the aircraft, the external socket 7 is in addition connected to the measuring, computing and control unit 4 by a connection 9. The computer and control unit 4 measures the external voltage applied to the multipin socket 7. The unit 4 includes a two-wire output 10 which supplies power to two of the multiple pins of the external socket 7.

The external source 25 is, for example, connected to a three-phase distribution bar 11 and supplies 400 Hertz current in the airport. The distribution bar can comprise several feeders Dn-1, Dn, Dn+1, ..., the feeder, line or cable, Dn for example being assigned to power supply to the aircraft 1 on the ground.

The cable Dn is connected to a multipin connector 12, which is a connector fitted to the aircraft socket 7, via a three-phase switch 13, normally electromechanical, whose two-wire control connection 14 is connected to two of the terminals of the multi-pin connector 12. This connection is achieved in such a way that, when the connector 12 is fitted to the conjugate socket 7, there is a continuity of electrical connection between the two-wire connection 10 and the two-wire connection 14. Opening and closing of the switch 13 are thus controlled by the unit 4 via its output 10.

In flight and during a certain time after landing, the line 3 is supplied with electrical power by the on-board APU 2, the switch X1 being open and switch X2 closed.

When the aircraft on the ground is to be supplied from the external source via the cable Dn, the connector 12 is connected to the external socket 7 of the aircraft The switch 13 is then open, so that this connection is made with the connector 12 de-energized.

From the cockpit, a power supply transfer order is then sent, via the connecting line 5, to the control unit 4, which then first supplies the two-wire connection 10 so that the two-wire connection 14 is also supplied, and closes the three-phase switch 13. The connector 12 and socket 7 are then supplied with electrical power by the external cable Dn The unit 4 then detects, via the connection 9, the presence of a three-phase voltage on the socket 7. It consequently controls the APU 2, via the connection symbolically represented by 15, to phase them with the external voltage, taken on the three-phase measuring line 9. In present day aircraft, this phasing is considered to be satisfactory by the unit 4 when it is achieved to within 90 degrees The unit 4 then orders closing of the switch X1 followed, approximately 60 milliseconds later, by opening of the switch X2. The line 3 is then supplied by the external source only, after a 60 ms overlap with the internal source 2.

This way of proceding has nevertheless proved dangerous, in particular (but not only) when the external source 25 is provided from the electrical mains by means of static converters.

Indeed, parallel connection of two three-phase sources 25 and 2, which has a duration of about 60 ms whereas these two sources are only in phase to within 90 degrees, can result in electrical power exchanges between them which can have the following consequences :

automatic shutdown of the external source 25 on overload, destruction of the external source 25 if electrical power is supplied to it by the internal source (APU) 2, the static converters not being able to absorb power, breaking of a shaft in the APU 2 due to stresses gene by the sudden increase of the power to be delivered by the APU, which is even more serious as it affects the aircraft itself.

Subsequent replacement of the external source by the internal source 2 is achieved by the reverse operations phasing of the APU 2 with the external voltage to within 90 degrees, closing of the switch X2 and opening of the switch X1 60 ms later, then opening of the external switch 13 and disconnection of the connector 12. During the 60 millisecond overlap period, the damaging phenomena described above can occur in exactly the same way. The object of the invention is to overcome these drawbacks.

SUMMARY OF THE INVENTION

The connecting device according to the invention comprises a two-way static switch connected between the external source and a power supply input socket on the aircraft, an impedance connected in parallel to the static switch, means for measuring the voltage at the terminals of the socket and a processing unit connected to the means for measuring the voltage and to control terminals of the switch so as to bring about closing of the switch when the voltage measured drops below a first preset threshold.

This device preferably comprises means for measuring the current flowing through it, the processing unit being connected to the means for measuring the current so as to bring about opening of the switch when the current measured is greater than a second preset threshold.

According to a development, the processing unit comprises means for computing the active power supplied by the device, according to the voltage and current measured, and brings about opening of the switch when said active power is negative, and time delay means keeping the switch open for a preset time delay period after making it open.

In a preferred embodiment, the switch comprises two head-to-tail thyristors controlled simultaneously by the processing unit, and the impedance is a resistance of high value, for example about a hundred ohms, in comparison with the rated load impedance of the external source.

The power supply is generally a multiphase power supply, said device comprising a switch and associated resistance per phase, the means for measuring the voltage and current measuring the voltage and current of each of the phases, the processing unit controlling all the switches simultaneously.

The processing unit preferably comprises means for rectifying the voltages measured and means for comparing the output signal of the rectifying means with the first preset threshold, and possibly means for performing vector summing of the voltages measured on the different phases, and means for comparing the output signal of said means with a third preset threshold so as to bring about closing of the switches when said output signal is lower than said third threshold.

BRIEF DESCRIPTION OF THE DRAWINGS

Other advantages and features will become more clearly apparent from the following description of an illustrative embodiment of the invention, given as a non-restrictive example only and represented in the accompanying drawings, in which :

FIG. 2 is a block diagram of the whole device, such as it is designed to be connected to the aircraft circuit bearing the reference 1 in FIG. 1 described above.

FIG. 3 is a wiring diagram of a particular embodiment of the auxiliary static switch of FIG. 2.

DESCRIPTION OF THE PREFERRED EMBODIMENT

Figure 1:
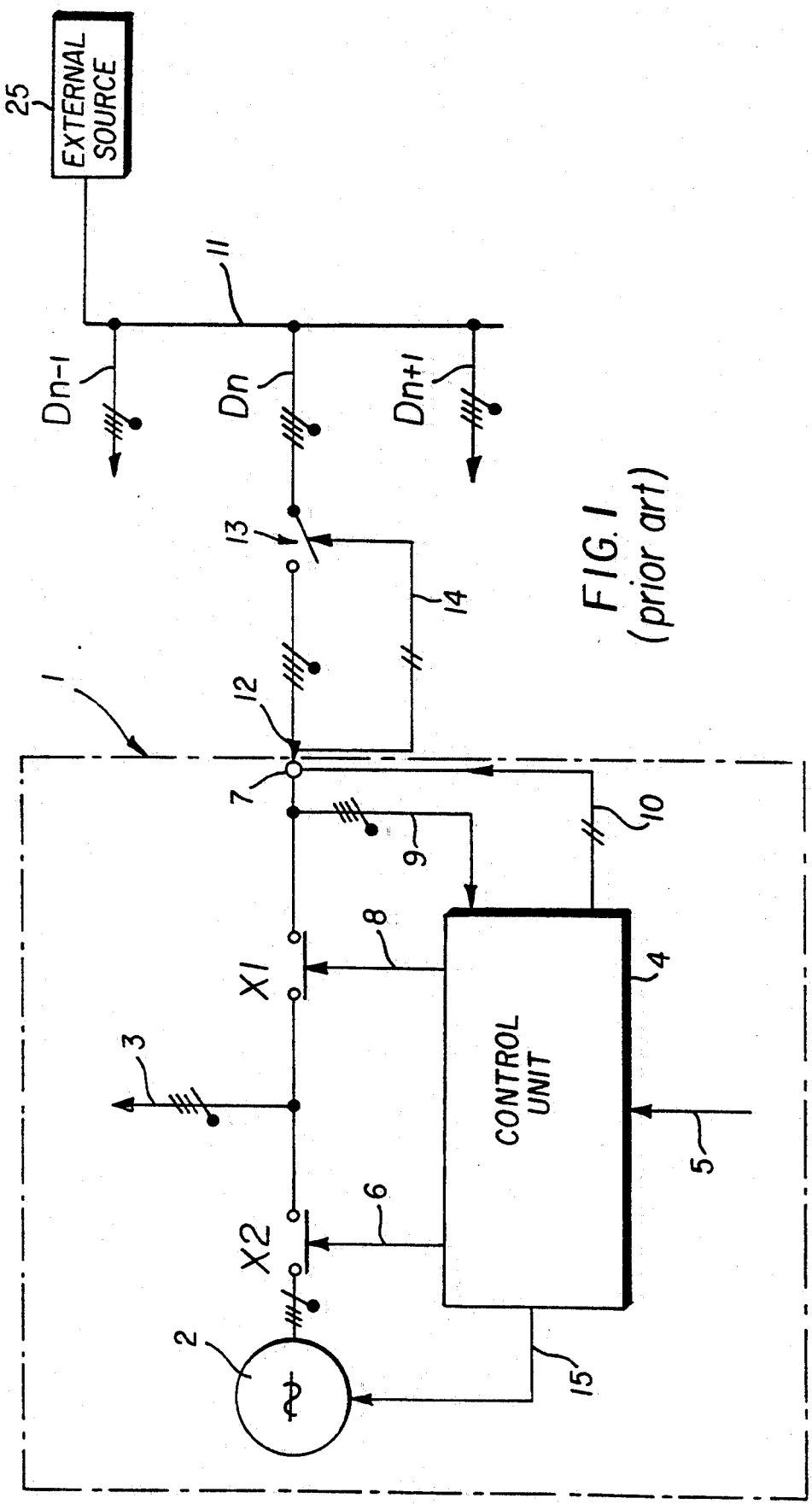
FIG. 1 shows a conventional installation.

The device according to the invention comprises, for each phase, a static switch 16 only one of which is represented in FIG. 2 so as to avoid needlessly over-complicating the figure. The switch 16 is connected to the external line Dn, between the electromechanical switch 13 and the multipin connector 12. For the sake of increased clarity, this static switch 16 is also represented in its full three-phase form in FIG. 3. It comprises on each phase a pair of head-to-tail thyristors T1, T2. These two thyristors are controlled together either on turn-on or on turn-off by a central electronic measuring, computing and control unit 17, respectively by the outputs 18, 19 of the latter.

An impedance, formed by a resistance R in the embodiment represented in the figures, is connected in parallel to each pair of thyristors T1, T2. The value of this resistance R must be high with respect to the rated load impedance of the external source 25 supplying the distribution bar 11. As this rated impedance is low, the resistance R can in principle have a value ranging from a few ohms to several hundred ohms. In actual fact, it must be neither too low so as not to have too large a dissipation and therefore volume, nor too high in order not to affect the external voltage measurement made (see FIG. 1) by the unit 4 via the measuring connection 9. A compromise between these two conditions is achieved by adopting a value of about one hundred ohms for this resistance R.

Provision is in addition made, for each phase, for measuring the voltage applied to the connector 12 which constitutes a measurement input 20 of the central unit 17 and for measuring the current flowing through the switch 16 by means of a measuring transformer 21, the current intensity signal thus collected being applied to a measuring input 22 of the central electronic processing unit 17.

Operation of the device, examined in the light of the set of FIGS. 1 to 3, will now be discussed. When the power supply by the internal source 2 of the aircraft is to be replaced by power supply by the external source 25, the procedure as seen from the aircraft itself 1 is unchanged : closing of the external relay 13, approximate phasing of the APU on the external source 25, closing of switch X1, then opening of switch X2 after 60 milliseconds. On closing of switch X1 however, the power supply to the line 3 by the source 25 takes place via the resistances R, the six thyristors T1, T2 all being off. During the overlap period of 60 ms when the two switches X1 and X2 are closed, none of the, above-mentioned damaging phenomena can occur due to the relatively high resistances R being connected on the line Dn : the current in the line is of too low intensity for there to be the slightest effective disturbance. When switch X2 opens, the power supply to the line 3 is then provided by the source 25 via the resistances R, which is naturally insufficient at high power, so that the external voltage on the terminals 7 and 12 drops suddenly. This drop in the three-phase voltage e1, e2, e3 (FIG. 3) is measured and detected by the processing unit 17. The latter comprises, for example, a six-phase rectifier 26 and a threshold circuit 27 comparing the rectifier output signal with a preset threshold S1 and emits (interface 28) turn-on control signals of the thyristors T1, T2 on its corresponding control outputs 18 and 19, when it detects voltages lower than the preset threshold S1. The static switch 16 is then closed and the external source 25 supplies the line 3 directly at full power via the closed switches 13, 16 and X1.

Figure 4:
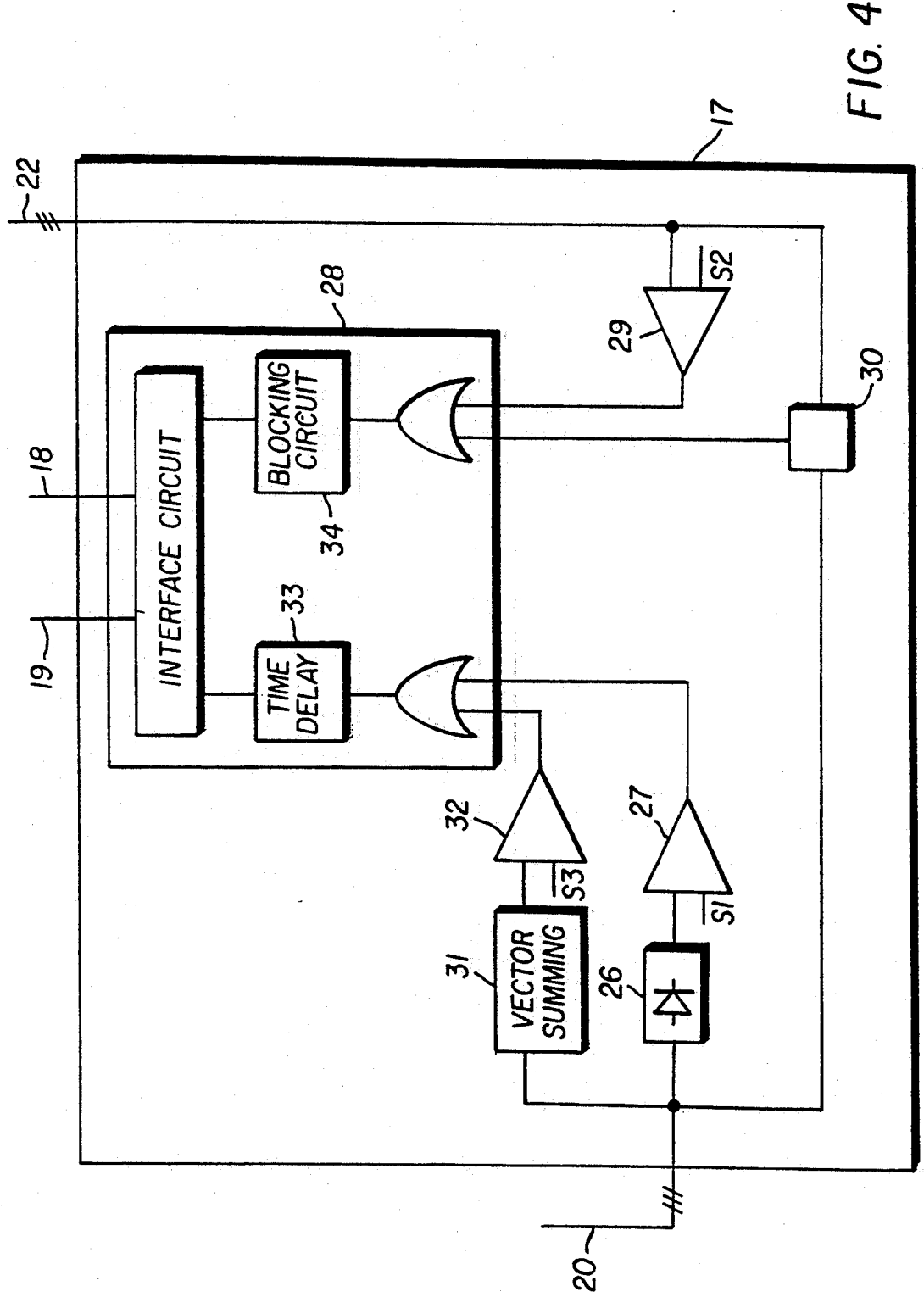
FIG. 4 shows an alternative embodiment of the central unit of a device according to FIG. 2.

The voltage measurement can correspond to the peak values of each of the successive rectified half-waves. In an extreme case, detection of the voltage drop is only performed two half-waves after the contacts of the three-phase switch X2 have opened. If this detection exceeds a duration of a few milliseconds, it is liable to result in a prohibitive lack of power supply to the line 3, and therefore to the in-board computers. This is why, according to an alternative embodiment, shown on FIG. 4, this detection is performed by a device built into the unit 17, comprising a vector summing circuit 3 measuring the vector sum of the voltages e1, e2, e3. This vector sum is normally nil, and is no longer nil as soon as the voltage drops on any one of the three phases (e1, e2 or e3). The processing unit 17 can then almost instantaneously detect the external voltage drop, by means of a threshold circuit 32, 53. This device can be advantageously connected in parallel to the above-mentioned rectifying and measuring device, the two criteria of detection and voltage drop then being used in parallel, the faster one bringing about closing of the switch 16.

Turn-on control of the thyristors T1, T2 must not be too fast, however, as this might take place whereas the three contacts of the three-phase switch X2 are in fact not yet all open, but only one or two of them may be open. In such a case, the two sources 2 and 25 would then be connected in parallel on one or two phases, thereby giving rise to the risk of the destructive phenomena described above occurring. This is why, if it is not certain that computing and control circuits slow enough to leave the switch X2 enough time to open fully have been used in the unit 17, it is advantageous to apply the closing signals to the wires 18 and 19 with a slight delay (about one millisecond in this example), by means of a time delay of about one millisecond incorporated in the unit 17 (time delay circuit 33).

When on the contrary, as the aircraft is to take off, the external source 25 has to be replaced by the in-board APU 2, the procedure as seen from the aircraft is still the same as with the device in FIG. 1 : approximate phasing of the APU 2 on the external source 25, closing of switch X2, then opening of switch X1 about 60 milliseconds later, and finally an opening order to the switch 13 so that the operator can disconnect the connector 12 in complete safety. When the switch X2 closes, three cases can arise. Either the APU 2 happen to be in phase with the external source 25, in which case no damaging phenomenon is to be feared and nothing special happens. The overlap does not give rise to any automatic action, and the thyristors T1 and T2 remain on normally. They of course turn off, due to lack of voltage on their terminals, when the external switch 13 is opened under the control of the unit 4. Or there is a phase difference between the two sources, and this phase difference is such that it results in an overcurrent flowing in the line Dn. This overcurrent is then immediately detected by a comparator 29 of the processing unit 17, which receives the measured value from the current sensor 21 and connection 22 and compares it with a threshold S2. The unit 17 orders immediate sending of turn-off signals of the thyristors T1, T2 to the connections 18, 19 when the overcurrent is detected. The source 25 is thereby practically disconnected from the circuit, considering the relatively high value of the resistances R. Or this phase difference is such that it results in a current flowing of a value lower than the overcurrent threshold S2, but such that the active power on the line Dn, calculated by summing means 30 of the unit 17 from the measured voltage 20 and current 22 values, is negative. The unit 17 (circuits 30 and 28) then orders immediate turn-off of the thyristors T1, T2.

In the second and third cases, a time delay t (blocking circuit 34, FIG. 4) has to be incorporated in the interface 28 ensuring that turn-off signals are maintained on the control wires 18 or 19 for at least several tens of milliseconds. In the absence of this time delay t, the thyristors would be liable to turn on again immediately due to the disturbance signals that could be generated in the installation by their status change.

In a particular aircraft configuration case, dealt with below, the time delay t will have to be set in such a way as not to exceed about thirty milliseconds. In this case, as represented in FIG. 2, one or more additional external sockets 23 are provided on the aircraft connected by switches 24 to the socket 7 downstream (with respect to the APU 2) from the switch X1. The switches 24 are controlled from the cockpit so that the sockets 23 are supplied by the external source 25, on the ground, in order to operate different equipment items on the ground, such as lifting equipment designed for loading and unloading of the aircraft. If an equipment item of this kind is connected to a socket 23, with the associated switch 24 closed, during the operation described above in which the internal source 2 is replaced by the external source 25, previous closing of the switch 13 will first of all result, due to the load constituted by the equipment item, in turning-on of the thyristors T1, T2, which is not damaging in itself.

Closing of the switch X1, which is normally performed afterwards, then however results in an overcurrent in the line Dn which is detected via the sensor 21 and then gives rise to turning-off of the thyristors T1, T2, with a time delay t during which they are kept in the off state. If this time delay t is high, for example if it is 100 milliseconds, nothing damaging will occur during the overlapping 60 milliseconds during which the switches X1 and X2 are both closed. However, the switch X2 will open at the end of these 60 milliseconds, so that during the remaining 40 milliseconds the line 3 will receive practically no electrical power since, although the switch X1 is closed, the external source can only deliver power via the resistances R. A prohibitive lack of power supply to the in-board computers will thus be created, whereas these computers cannot tolerate a break of more than a few milliseconds.

A value therefore has to be adopted for the above-mentioned time delay t which is in all cases not greater than 60 milliseconds, but which is nevertheless sufficient. A value of about 30 milliseconds has been found to be satisfactory, and in such a case the device of the invention operates reliably the thyristors T1, T2 are off when the switch X2 opens at the end of the cycle, and they are then immediately made to close (turn-on) by the voltage drop on the external socket 7.

The invention is naturally in no way limited to the embodiment described above. Notably the external source can be of any other kind than a source using static converters : electrical generating set or other sources. The resistances R could, for example, be replaced by impedances, but this solution is more costly.

We claim:

1. A device for connecting an external A.C. electrical power supply source to an aircraft on the ground, comprising a two-way static switch connected between the external source and a power supply input socket of the aircraft, an impedance connected in parallel to the static switch, means for measuring the voltage at terminals of the socket and a processing unit connected to the means for measuring the voltage and to control terminals of the switch so as to close the switch when the voltage measured drops below a first preset threshold.

2. The device according to claim 1, comprising means for measuring the current flowing through said device, the processing unit being connected to the means for measuring the current so as to bring about opening of the switch when the current measured is greater than a second preset threshold.

3. The device according to claim 2, wherein the processing unit comprises means for computing the active power supplied by the device, according to the voltage and current measured, and brings about opening of the switch when said active power is negative.

4. The device according to claim 3, wherein the processing unit comprises blocking means keeping the switch open for means a preset time delay period after making it open.

5. The device according to claim 4, wherein the time delay period is lower than 60 ms.

6. The device according to claim 4, wherein the time delay period is 30 ms.

7. The device according to claim 1, wherein the switch comprises two head-to-tail thyristors controlled simultaneously by the processing unit.

8. The device according to claim 1, wherein the impedance about a hundred ohms.

9. The device according to claim 1, wherein the power supply source is a multiphase power supply, said device comprising a switch and associated impedance per phase, the means for measuring the voltage and current measuring the voltage and current of each of the phases, the processing unit controlling all the switches simultaneously.

10. The device according to claim 8, wherein the processing unit comprises means for rectifying the voltages measured and means for comparing the output signal of the rectifying means with the first preset threshold.

11. The device according to claim 8, wherein the processing unit comprises summing means for performing vector summing of the voltages measured on the different phases, and means for comparing the output signal of said summing means with a third preset threshold so as to close the switches when said output signal is lower than said third threshold.

* * * * *